US009377350B2

(12) United States Patent  
Howard et al.

(10) Patent No.: US 9,377,350 B2  
(45) Date of Patent: Jun. 28, 2016

(54) LIGHT SENSOR WITH CHEMICALLY RESISTANT AND ROBUST REFLECTOR STACK

(71) Applicant: Newport Fab, LLC, Newport Beach, CA (US)

(72) Inventors: David J. Howard, Irvine, CA (US); Jeff Rose, Hawthorne, CA (US); Arjun Kar-Roy, Irvine, CA (US); Michael J. DeBar, Tustin, CA (US)

(73) Assignee: Newport Fab, LLC, Newport Beach, CA (US)

( * ) Notice: Subject to any disclaimer, the term of this patent is extended or adjusted under 35 U.S.C. 154(b) by 0 days.

(21) Appl. No.: 14/827,112

(22) Filed: Aug. 14, 2015

(65) Prior Publication Data

US 2016/0069739 A1    Mar. 10, 2016

Related U.S. Application Data

(60) Provisional application No. 62/045,706, filed on Sep. 4, 2014.

(51) Int. Cl.  
*G01J 1/04* (2006.01)

(52) U.S. Cl.  
CPC ........................ *G01J 1/0414* (2013.01)

(58) Field of Classification Search  
CPC ................. G01J 1/04; G01J 5/00; G01J 5/10; H01L 27/14  
See application file for complete search history.

(56) References Cited

U.S. PATENT DOCUMENTS

| | | | | |
|---|---|---|---|---|
| 6,898,265 | B1* | 5/2005 | Mliner | A61B 6/032 250/370.11 |
| 2007/0273887 | A1* | 11/2007 | Russell | A61M 16/08 356/450 |
| 2009/0140148 | A1* | 6/2009 | Yang | G01J 5/20 250/338.4 |
| 2010/0148067 | A1* | 6/2010 | Cheon | G01J 5/02 250/338.1 |
| 2011/0042569 | A1* | 2/2011 | Cho | G01J 5/20 250/338.3 |
| 2012/0235045 | A1* | 9/2012 | Kurashina | G01J 5/045 250/353 |
| 2014/0166887 | A1* | 6/2014 | Murphy | G01T 1/2018 250/366 |

* cited by examiner

*Primary Examiner* — Marcus Taningco  
(74) *Attorney, Agent, or Firm* — Bever, Hoffman & Harms, LLP

(57) ABSTRACT

A light sensor having a chemically resistant and robust reflector stack is disclosed. The reflector stack is formed over a substrate, and includes an adhesion layer, a patterned reflector layer over the adhesion layer, and a smoothing layer over the patterned reflector layer. The patterned reflector layer has a substantially flat top surface. A conformal passivation layer covers the reflector stack. An absorbing layer is situated above the reflector stack and separated from the reflector stack. The absorbing layer is supported by vias over the substrate. The absorbing layer is connected to at least one resistor, where a resistance of the at least one resistor varies in response to light absorbed by the absorbing layer. The vias are disposed on via landing pads on the substrate.

20 Claims, 7 Drawing Sheets

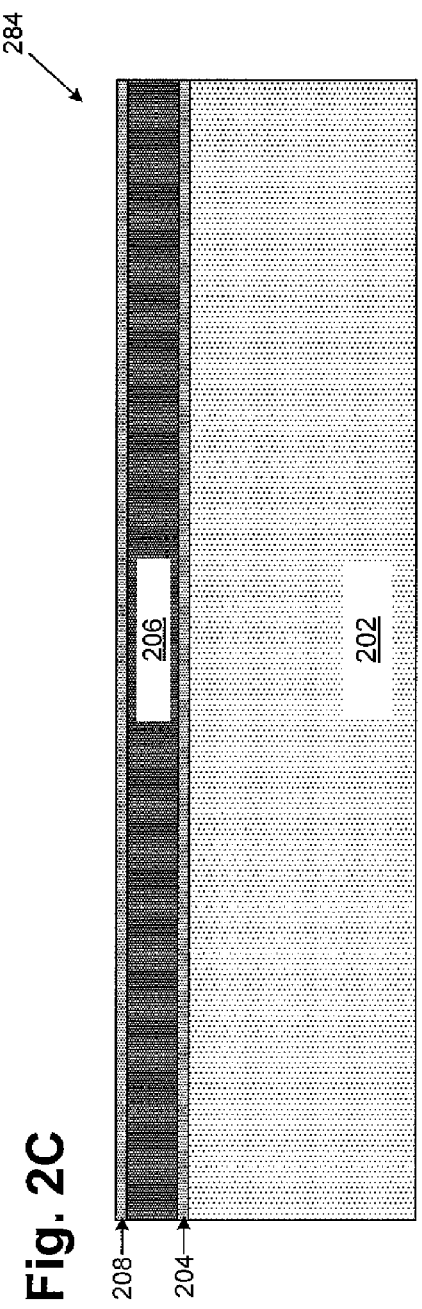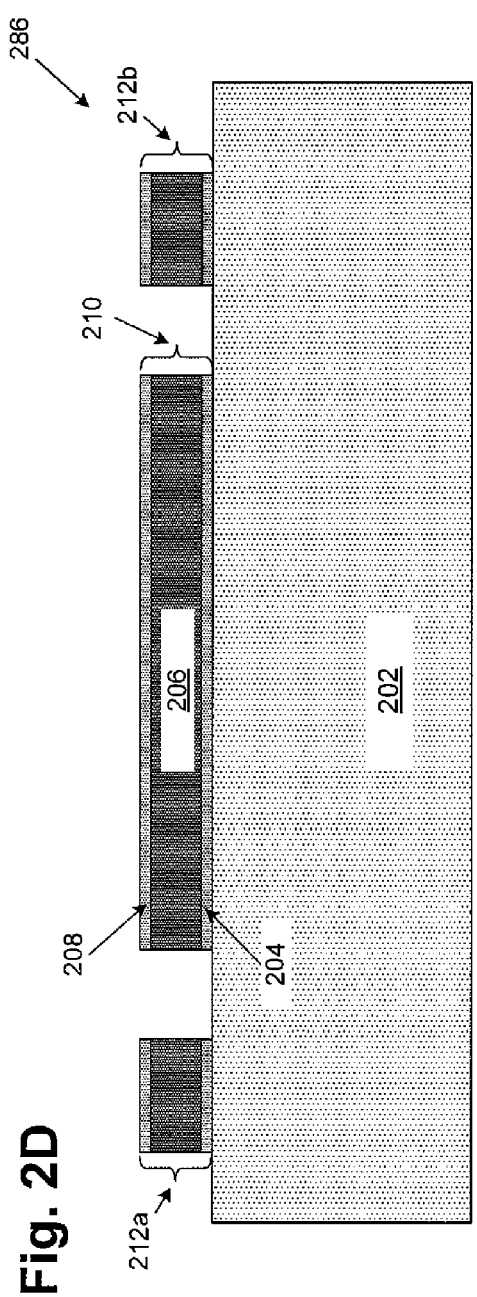

LIGHT SENSOR WITH CHEMICALLY RESISTANT AND ROBUST REFLECTOR STACK

BACKGROUND

The present application claims the benefit of and priority to a provisional patent application entitled "Light Sensor with Chemically Resistant and Robust Reflector Stack," Ser. No. 62/045,706 filed on Sep. 4, 2014. The disclosure in this provisional application is hereby incorporated fully by reference into the present application.

Light sensors, such as infrared sensors, can operate on the principle that electrical resistance of an absorbing layer changes in response to radiation reflected from a reflector underlying the absorbing layer. For example, when the absorbing layer gets heated by radiation reflected from the reflector, a change in electrical resistance can be detected by a readout integrated circuit. The sensitivity of the light sensor may depend on many factors, such as the planarity of the reflector. For example, a substantially flat reflector surface can greatly improve a signal to noise ratio to ensure the sensitivity of the light sensor.

Since the reflector of the light sensor is an underlying layer below the absorbing layer, the reflector is formed, for example, on a substrate before other features of the light sensor are formed. As a result, the reflector is subject to harsh chemical and temperature environments during downstream processing actions, such as polishing, high power asking, and etching. Thus, the reflective properties of the reflector in the light sensor can be greatly impacted by these downstream processing actions, resulting in a decreased sensitivity of the light sensor.

Thus, there is a need in the art for robust and chemically resistant reflector structures to enhance structural and functional performance and stabilities of the light sensors.

SUMMARY

The present disclosure is directed to a light sensor with chemically resistant and robust reflector stack, substantially as shown in and/or described in connection with at least one of the figures, and as set forth in the claims.

BRIEF DESCRIPTION OF THE DRAWINGS

FIG. 2C illustrates a cross-sectional view of a portion of a light sensor with a chemically resistant and robust reflector stack processed in accordance with an intermediate action in the flowchart of FIG. 1 according to one implementation of the present application.

FIG. 2D illustrates a cross-sectional view of a portion of a light sensor with a chemically resistant and robust reflector stack processed in accordance with an intermediate action in the flowchart of FIG. 1 according to one implementation of the present application.

DETAILED DESCRIPTION

Figure 1:
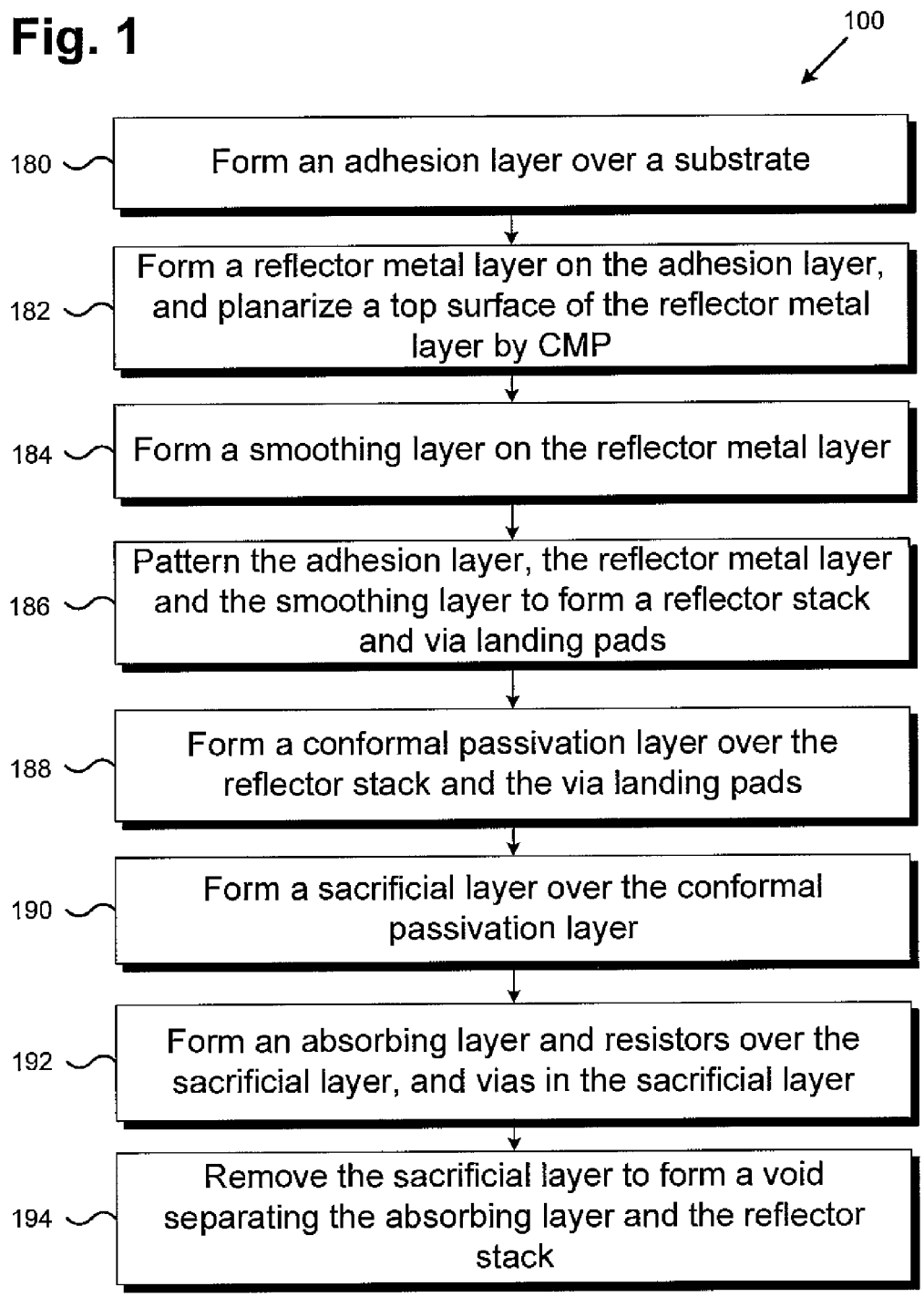
FIG. 1 is a flowchart illustrating a method for fabricating a light sensor with a chemically resistant and robust reflector stack according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a flowchart illustrating an exemplary method of forming a light sensor according to an implementation of the present inventive concepts. Certain details and features have been left out of flowchart 100 that are apparent to a person of ordinary skill in the art. For example, an action may consist of one or more subactions or may involve specialized equipment or materials, as known in the art. Actions 180, 182, 184, 186, 188, 190, 192 and 194 indicated in flowchart 100 are sufficient to describe one implementation of the present inventive concepts, other implementations of the present inventive concepts may utilize actions different from those shown in flowchart 100. Moreover, structures 280, 282, 284, 286, 288, 290, 292 and 294 in FIGS. 2A, 2B, 2C, 2D, 2E, 2F, 2G and 2H illustrate the results of performing actions 180, 182, 184, 186, 188, 190, 192 and 194 of flowchart 100, respectively. For example, structure 280 is an exemplary structure of a portion of a light sensor after processing action 180, structure 282 is an exemplary structure of a portion of a light sensor after the processing of action 182, structure 284 is an exemplary structure of a portion of a light sensor after the processing of action 184, and so forth.

Figure 2A:
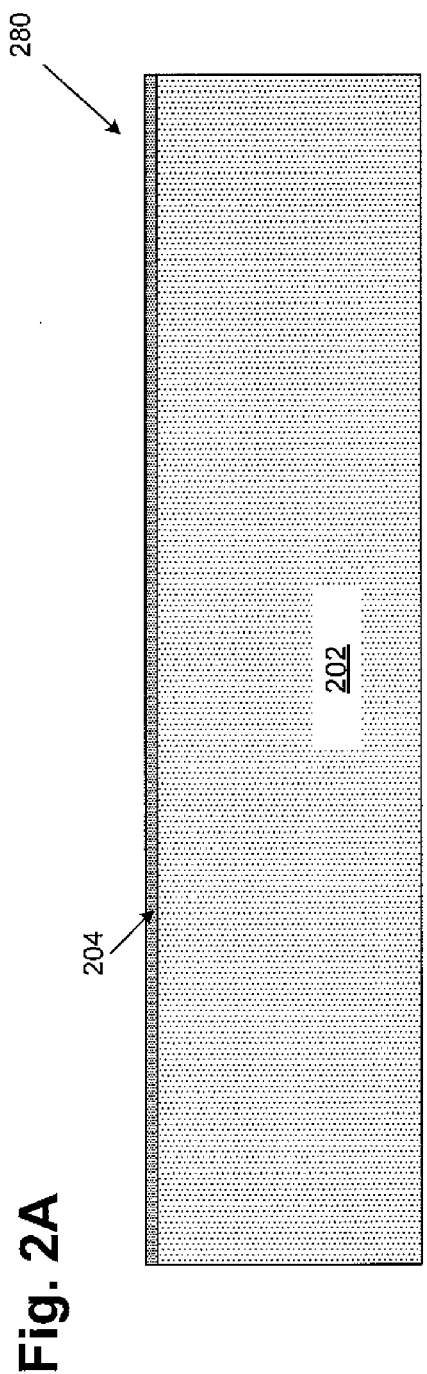
FIG. 2A illustrates a cross-sectional view of a portion of a light sensor with a chemically resistant and robust reflector stack processed in accordance with an initial action in the flowchart of FIG. 1 according to one implementation of the present application.

Referring to action 180 in FIG. 1 and structure 280 in FIG. 2A, action 180 of flowchart 100 includes forming an adhesion layer over a substrate. As illustrated in FIG. 2A, structure 280 includes adhesion layer 204 formed over substrate 202. Substrate 202 can include any suitable material to support a light sensor thereon. In one implementation, substrate 202 may be a semiconductor substrate, having silicon, silicon-on-insulator (SOD, silicon-on-sapphire (SOS), silicon germanium, an epitaxial layer of silicon formed on a silicon substrate, or the like. In another implementation, substrate 202 may be a dielectric layer, such as an interlayer dielectric situated over an underlying semiconductor substrate. In yet another implementation, substrate 202 may be a dielectric substrate. Substrate 202 may include a readout integrated circuit (not explicitly shown in FIG. 2A) formed on or within the substrate.

As illustrated in FIG. 2A, adhesion layer 204 is formed over substrate 202, and may include, for example, Titanium (Ti), Titanium Nitride (TiN), or a combination of both materials. Adhesion layer 204 is configured to promote adhesion between substrate 202 and a reflector metal layer, which is to be deposited over adhesion layer 204 in the subsequent action. Also, adhesion layer 204 can set up repeatable grain structures having small grain sizes for receiving reflector metal layer 206 to improve planarity at the interface between the two layers. In addition, the implementation of adhesion layer 204 may result in a smoother top surface of the reflector metal layer to be formed thereon. In the present implementation, adhesion layer 204 has a thickness between 50-250 Å. In other implementations, adhesion layer 204 may be greater than or less than 50-250 Å to suit the specific needs of a particular application.

Figure 2B:
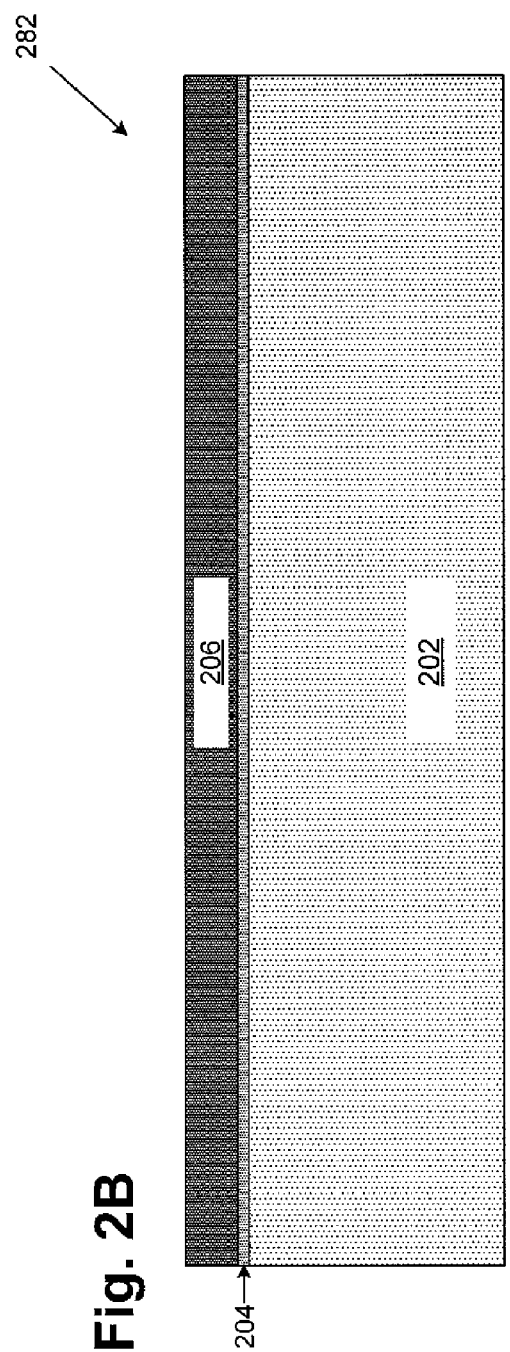
FIG. 2B illustrates a cross-sectional view of a portion of a light sensor with a chemically resistant and robust reflector stack processed in accordance with an intermediate action in the flowchart of FIG. 1 according to one implementation of the present application.

Referring to action 182 in FIG. 1 and structure 282 in FIG. 2B, action 182 of flowchart 100 includes forming a reflector metal layer on an adhesion layer, and planarizing a top surface of the reflector metal layer, for example, by Chemical Mechanical Polishing (CMP). As illustrated in FIG. 2B, structure 282 includes reflector metal layer 206 formed over adhesion layer 204. Reflector metal layer 206 may be formed by depositing a reflective metal layer over adhesion layer 204, and planarizing a top surface thereof by using, for example, CMP. In one implementation, the planarizing of the top surface of the reflective metal layer may be optional. The thickness and planarity of reflector metal layer 206 can be further modulated by an etch process, such as a blanket etch after the CMP.

As illustrated in FIG. 2B, reflector metal layer 206 has a top planar surface that is configured to provide substantially uniform reflection. In the present implementation, reflector metal layer 206 includes pure aluminum. In another implementation, reflector metal layer 206 may include aluminum with 0.5 weight percent copper. In other implementations, reflector metal layer 206 may include titanium or any other suitable reflective materials. Reflector metal layer 206 may have a thickness between 500-2500 Å. In the present implementation, reflector metal layer 206 has a thickness of 1000 Å. In other implementations, reflector metal layer 206 may be greater than or less than 1000 Å to suit the specific needs of a particular application. For example, the thickness of reflector metal layer 206 may be determined based on the specific wavelength of interest of the light sensor.

Referring to action 184 in FIG. 1 and structure 284 in FIG. 2C, action 184 of flowchart 100 includes forming a smoothing layer on a reflector metal layer. As illustrated in FIG. 2C, structure 284 includes smoothing layer 208 formed over reflector metal layer 206. Smoothing layer 208 may be formed by depositing Titanium (Ti), Titanium Nitride (TiN), or a combination of both materials over reflector metal layer 206, and planarizing a top surface of thereof by using, for example, CMP. The thickness and planarity of smoothing layer 208 can be also modulated by an etch process, such as a blanket etch after a CMP. Thus, the CMP and/or the etching process can provide manufacturing process margin as well as suitable conductive and reflective functionality for the reflector stack.

In the present implementation, smoothing layer 208 is configured to set up repeatable grain structures having small grain sizes to smooth bumpy aluminum in reflector metal layer 206, thereby improving planarity of reflector metal layer 206. For example, smoothing layer 208 can keep reflector metal layer 206 from becoming bumpy or turning in to spherical shapes when the light sensor undergoes a high thermal budget processing action, such as an anneal process. In the present implementation, smoothing layer 208 may have a thickness between 50-300 Å. In other implementations, smoothing layer 208 may be greater than or less than 50-300 Å, and may include other suitable capping materials, such as cladding materials.

Referring to action 186 in FIG. 1 and structure 286 in FIG. 2D, action 186 of flowchart 100 includes patterning an adhesion layer, an reflector metal layer and an smoothing layer to form a reflector stack and via landing pads. As illustrated in FIG. 2D, structure 286 includes reflector stack 210, via landing pads 212a and 212b formed on substrate 202. Reflector stack 210, via landing pads 212a and 212b are formed, for example, by masking and patterning smoothing layer 208, reflector metal layer 206 and adhesion layer 204 in structure 284 in FIG. 2D. Reflector stack 210 includes patterned adhesion layer 204, patterned reflector metal layer 206, and patterned smoothing layer 208.

As illustrated in FIG. 2D, via landing pads 212a and 212b have substantially the same structure and are formed of substantially the same material as reflector stack 210, since they are patterned from structure 284 in the same processing action, action 186. In structure 286, a top surface of smoothing layer 208 and the sidewalls of patterned adhesion layer 204, reflector metal layer 206, and smoothing layer 208 in reflector stack 210 and via landing pads 212a and 212b are exposed, thus susceptible to corrosion and vulnerable chemicals and/or harsh environment during subsequent processing actions.

Figure 2E:
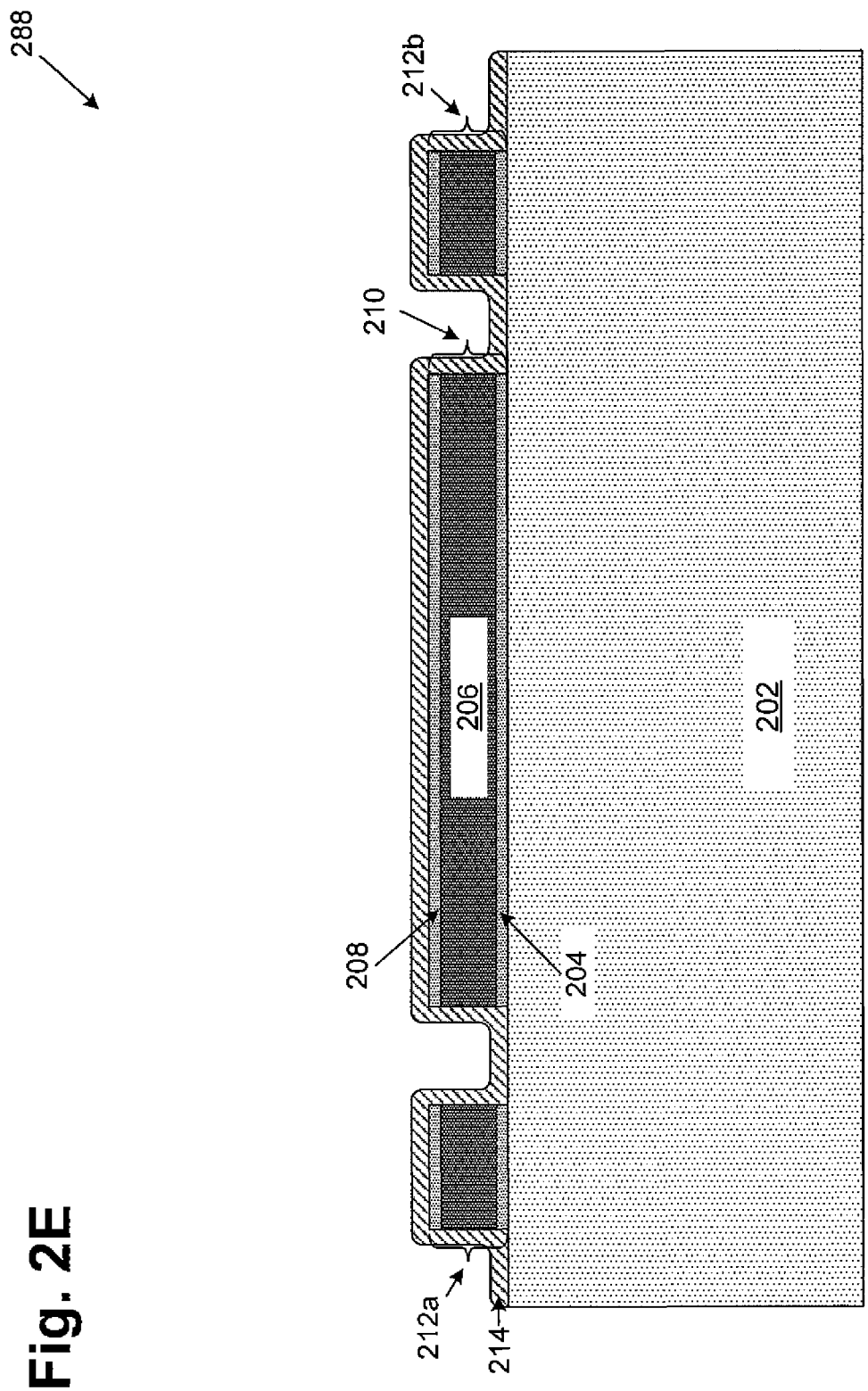
FIG. 2E illustrates a cross-sectional view of a portion of a light sensor with a chemically resistant and robust reflector stack processed in accordance with an intermediate action in the flowchart of FIG. 1 according to one implementation of the present application.

Referring to action 188 in FIG. 1 and structure 288 in FIG. 2E, action 188 of flowchart 100 includes forming a conformal passivation layer over the reflector stack and via landing pads. As illustrated in FIG. 2E, structure 288 includes conformal passivation layer 214 formed over reflector stack 210 and via landing pads 212a and 212b on substrate 202. As illustrated in FIG. 2E, conformal passivation layer 214 is coated on the top surfaces and sidewalls of patterned adhesion layer 204, reflector metal layer 206, and smoothing layer 208 in reflector stack 210 and via landing pads 212a and 212b.

In the present implementation, conformal passivation layer 214 includes silicon oxide due to silicon oxide's transparent property to many wavelengths and for allowing reflection of light from reflector stack 210 substantially without interference and/or obstruction. In another implementation, conformal passivation layer 214 may include silicon oxi-nitride (SiONx), silicon nitride (SiNx), or any combination thereof. In other implementations, conformal passivation layer 214 may include other materials, such as chemical and/or etch resistant materials.

As illustrated in FIG. 2E, conformal passivation layer 214 seals the entire reflector stack 210, including the top surface of smoothing layer 208 and the sidewalls of adhesion layer 204, reflector metal layer 206, and smoothing layer 208. Conformal passivation layer 214 can protect reflector stack 210, especially, reflector metal layer 206, against corrosion. Also, as discussed below, conformal passivation layer 214 can provide a barrier for reflector stack 210 against chemicals and/or harsh environment during subsequent processing actions, and provide structural and functional stabilities for the lifetime of the light sensor. In the present implementation, conformal passivation layer 214 has a thickness between 100-300 Å. In other implementations, conformal passivation layer 214 may be greater than or less than 100-300 Å to suit the specific needs of a particular application without compromising the reflective properties of reflector stack 210.

Figure 2F:
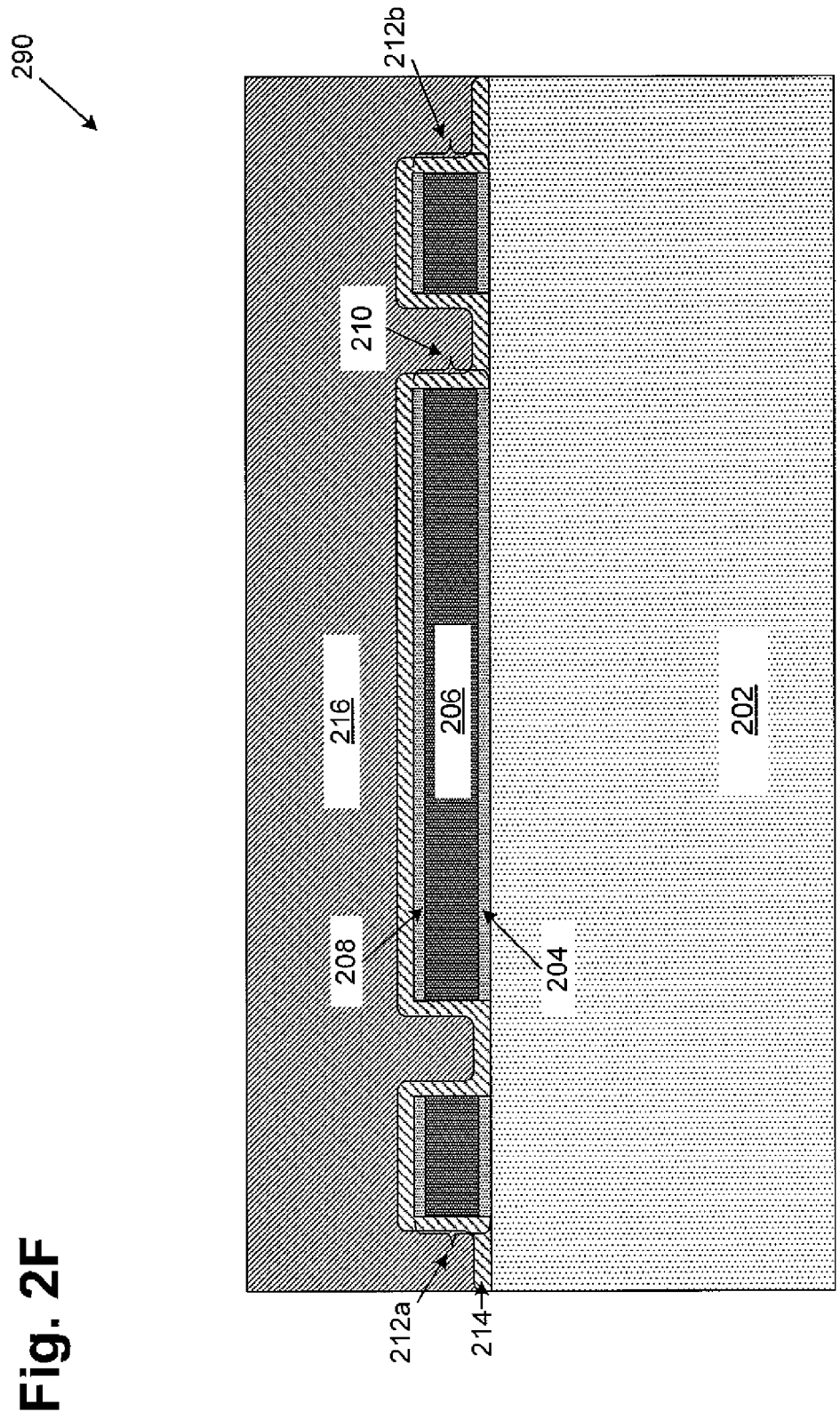
FIG. 2F illustrates a cross-sectional view of a portion of a light sensor with a chemically resistant and robust reflector stack processed in accordance with an intermediate action in the flowchart of FIG. 1 according to one implementation of the present application.

Referring to action 190 in FIG. 1 and structure 290 in FIG. 2F, action 190 of flowchart 100 includes forming a sacrificial layer over a conformal passivation layer. As illustrated in FIG. 2F, structure 290 includes sacrificial layer 216 formed over conformal passivation layer 214. In the present implementation, sacrificial layer 216 includes a polymer layer. For example, exemplary polymers that can be used to form sacrificial layer 216 may include, but not limited to, polyimides, polyamides (e.g., HD-2610), SU-8 photoresist, spin-on dielectrics (SOD), long chain polymers up to 10 microns. In the present implementation, sacrificial layer 216 has a thickness of about 1.5-2.5 microns. In other implementations, sacrificial layer 216 may have a thickness greater than or less than 1.5-2.5 microns to suit the specific needs of a particular application.

Figure 2G:
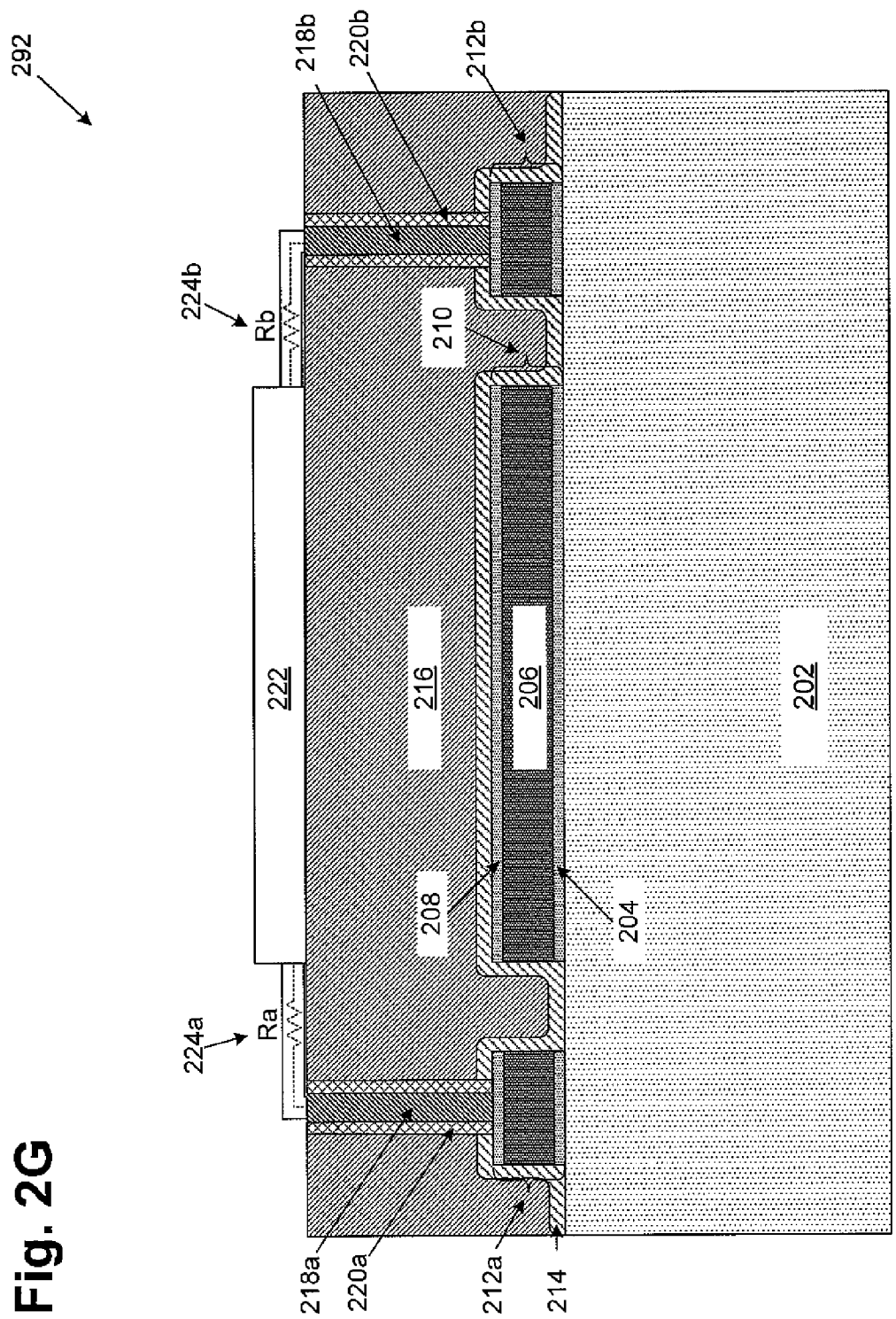
FIG. 2G illustrates a cross-sectional view of a portion of a light sensor with a chemically resistant and robust reflector stack processed in accordance with an intermediate action in the flowchart of FIG. 1 according to one implementation of the present application.

Referring to action 192 in FIG. 1 and structure 292 in FIG. 2G, action 192 of flowchart 100 includes forming an absorbing layer and resistors over a sacrificial layer, and vias in a sacrificial layer. As illustrated in FIG. 2G, structure 292 includes absorbing layer 222, resistors 224a and 224b, and vias 218a and 218b formed on sacrificial layer 216. As illustrated in FIG. 2G, absorbing layer 222 and resistors 224a and 224b are formed on sacrificial layer 216. Vias 218a and 218b extend through sacrificial layer 216 and conformal passivation layer 214 to make electrical and mechanical contact with via landing pads 212a and 212b, respectively. Absorbing layer 222 may include materials, such as amorphous silicon or vanadium oxide, to detect reflected radiation from reflector stack 210. Resistors 224a and 224b may include metallic alloy, polysilicon, or other suitable resistive materials. Vias 218a and 218b may include tungsten (W), titanium (Ti), or any other suitable electrically conductive metallic material. As illustrated in FIG. 2G, vias 218a and 218b are coated with dielectric liners 220a and 220b, respectively. Dielectric liners 220a and 220b may include tetraethylorthosilicate (TEOS) or oxide material, and can provide a rigid mechanical structure for vias 218a and 218b, such that vias 218a and 218b can stand on their own and provide support for absorbing layer 222, for example.

Figure 2H:
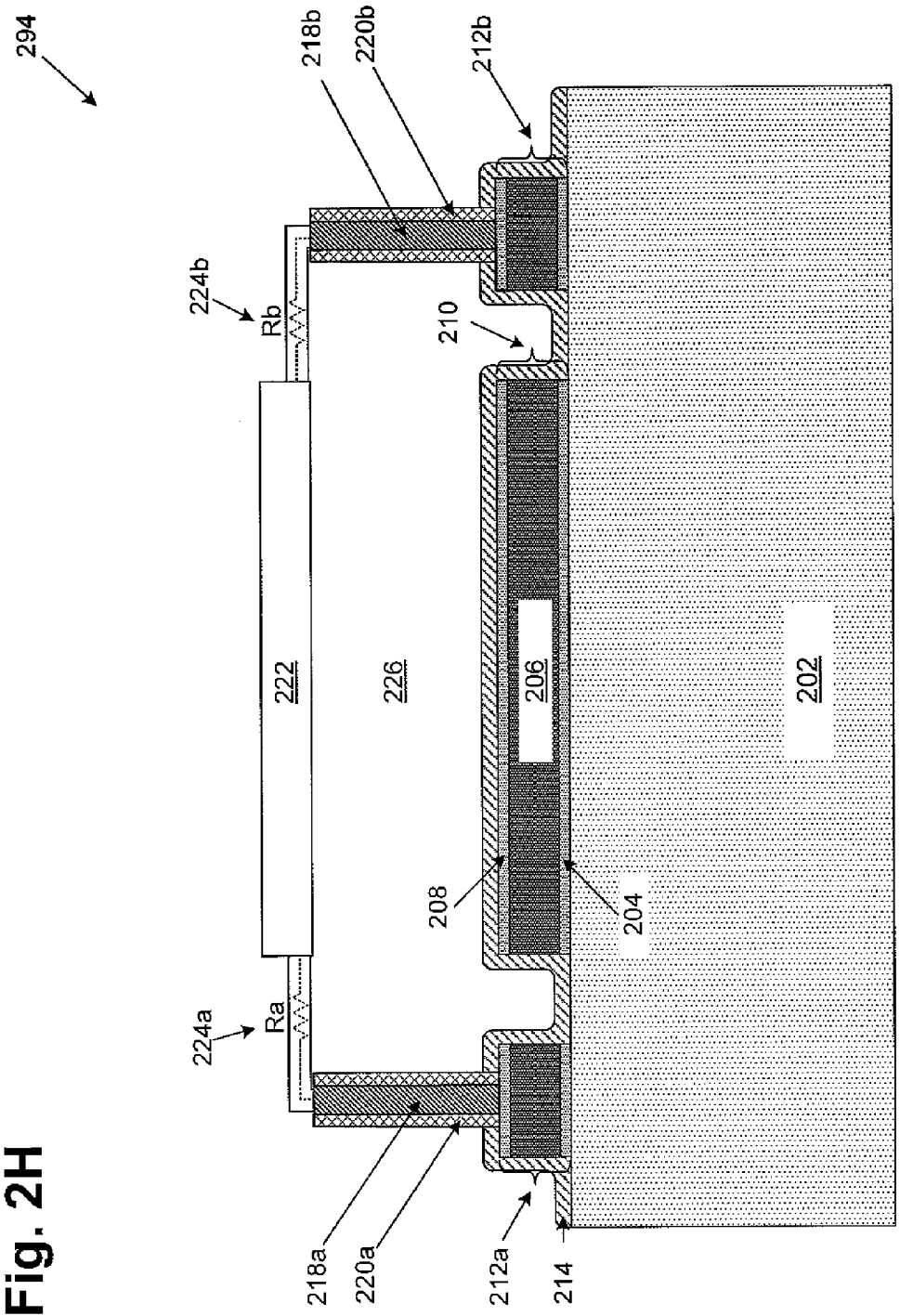
FIG. 2H illustrates a cross-sectional view of a portion of a light sensor with a chemically resistant and robust reflector stack processed in accordance with a final action in the flowchart of FIG. 1 according to one implementation of the present application.

Referring to action 194 in FIG. 1 and structure 294 in FIG. 2H, action 194 of flowchart 100 includes removing a sacrificial layer to form a void separating an absorbing layer and a reflector stack. As illustrated in FIG. 2H, structure 294 includes a light sensor, such as an infrared sensor, formed on substrate 202 after sacrificial layer 216 is removed from structure 292 in FIG. 2G, for example.

The removal of sacrificial layer 216 can be achieved by, for example, using oxygen plasmas or various other removal processes known in the art. In addition, chlorine rich and/or fluorine rich chemistry, such as chlorinated gases and/or fluorinated gases, can be used to during the removal of sacrificial layer 216. During the removal process, for example, using oxygen plasma, oxygen plasma may attack metals (e.g., oxide metal surfaces), which would lead to corrosion and peeling of reflector stack 210, if conformal passivation layer 214 were not present. Chlorine or fluorine containing gases can also attack metals to cause a reflecting surface to be uneven and/or non-planar. Thus, the presence of conformal passivation layer 214 provides a barrier for reflector stack 210 and via landing pads 212a and 212b against chemicals and/or harsh environment during the removal of sacrificial layer 216 and prevents corrosion and chemical attacks during the removal of sacrificial layer 216 and any other subsequent processing actions, thereby providing structural and functional stabilities for the lifetime of the light sensor in structure 294, for example.

As illustrated in FIG. 2H, structure 294 includes a light sensor, such as an infrared sensor. In other implementations, structure 294 may include a microbolometer device or other types of optical sensors. Structure 294 includes reflector stack 210 underneath absorbing layer 222. Reflector stack 210 includes patterned adhesion layer 204, patterned reflector metal layer 206 and patterned smoothing layer 208. Adhesion layer 204 is situated on substrate 202 to promote adhesion between substrate 202 and reflector metal layer 206. Adhesion layer 204 is also configured to set up repeatable grain structures having small grain sizes for receiving reflector metal layer 206 to improve planarity at the interface between the two layers. In addition, the implementation of adhesion layer 204 results in a substantially flat top surface of reflector metal layer 206.

As illustrated in FIG. 2H, reflector metal layer 206 is situated over adhesion layer 204. Reflector metal layer 206 has a substantially flat top surface that can provide substantially uniform reflection. Smoothing layer 208 is situated over reflector metal layer 206. Smoothing layer 208 is configured to keep reflector metal layer 206 from becoming bumpy or turning in to spherical shapes when structure 294 undergoes a high thermal budget processing action, such as an anneal process. Thus, adhesion layer 204, reflector metal layer 206 and smoothing layer 208 together form reflector stack 210 on substrate 202.

As illustrated in FIG. 2H, conformal passivation layer 214 is formed over reflector stack 210 and via landing pads 212a and 212b. Conformal passivation layer 214 seals the entire reflector stack 210, including the top surface of smoothing layer 208 and the sidewalls of adhesion layer 204, reflector metal layer 206, and smoothing layer 208, which would otherwise be exposed and susceptible to corrosion and vulnerable to chemicals and/or harsh environment during subsequent processing action. Thus, the presence of conformal passivation layer 214 protects the otherwise exposed surfaces. In addition, conformal passivation layer 214 can provide a barrier for reflector stack 210 against chemicals and/or harsh environment during subsequent processing actions, and provide structural and functional stabilities for the lifetime of the light sensor. Conformal passivation layer 214 can also provide protection for via landing pads 212a and 212b, which may have substantially the same structure and are formed of substantially the same materials as reflector stack 210.

As further illustrated in FIG. 2H, absorbing layer 222 is connected to resistors 224a and 224b, and suspended above reflector stack 210 with the support provided by vias 218a and 218b. Absorbing layer 222 is separated from reflector stack 210 by void 226. Vias 218a and 218b are coated with dielectric liners 220a and 220b, respectively. Vias 218a and 218b are electrically and mechanically connected to via landing pads 212a and 212b, respectively, where signals from the light sensor can be transmitted to a readout integrated circuit (not explicitly shown in FIG. 2H) on or within substrate 202 through vias 218a and 218b. In the present implementation, structure 294 can be packaged in a vacuum. In other implementation, structure 294 can be packaged in air.

In one implementation, the removal of sacrificial layer 216 from structure 292 in FIG. 2G is optional, such that the light sensor may include sacrificial layer 216 between reflector stack 210 and absorbing layer 222, where sacrificial layer may be selected from substantially transparent material to any desirable wavelengths for allowing reflection of light from reflector stack 210 to absorbing layer 222 substantially without interference and/or obstruction.

Thus, implementations of the present application utilize a reflector metal layer capped by a smoothing layer to modulate the thickness and planarity of the reflector stack, which can provide manufacturing process margin as well as suitable conductive and reflective functionality. A chemically resistant layer atop the reflector stack enables more aggressive and robust BEOL (back end of line) processing. Implementations of the present application can utilize standard CMOS process modules which are leveraged in such a way as to manufacture a module which is highly beneficial to one or more light sensors, such as infrared sensors and MEMS microbolometer devices. Implementations of the present application lend manufacturing paths to eliminating non-planarity in contrast to other processes incorporating non-planarity as part of their processing.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A light sensor comprising:
   a reflector stack over a substrate, said reflector stack having an adhesion layer, a patterned reflector layer over said adhesion layer, and a smoothing layer over said patterned reflector layer;
   a conformal passivation layer covering said reflector stack;
   an absorbing layer above said reflector stack and separated from said reflector stack.

2. The light sensor of claim 1, wherein said absorbing layer is separated from said reflector stack by a void.

3. The light sensor of claim 1, wherein said absorbing layer is separated from said reflector stack by a sacrificial layer.

4. The light sensor of claim 1, wherein said absorbing layer is supported by vias over said substrate.

5. The light sensor of claim 1, wherein said absorbing layer is connected to at least one resistor, wherein a resistance of said at least one resistor varies in response to light absorbed by said absorbing layer.

6. The light sensor of claim 1, wherein said adhesion layer comprises titanium (Ti) and/or titanium nitride (TiN).

7. The light sensor of claim 1, wherein said smoothing layer comprises Ti and/or TiN.

8. The light sensor of claim 1, wherein said patterned reflector layer comprises aluminum (Al).

9. The light sensor of claim 1, wherein said conformal passivation layer comprises silicon oxide.

10. The light sensor of claim 4, wherein said vias are disposed on via landing pads on said substrate.

11. The light sensor of claim 1, wherein said patterned reflector layer includes a substantially flat top surface.

12. The light sensor of claim 1, wherein said light sensor comprises an infrared sensor.

13. A method of fabricating a light sensor comprising:
   forming an adhesion layer over a substrate;
   forming a reflector metal layer over said adhesion layer;
   forming a smoothing layer over said reflector metal layer;
   patterning said adhesion layer, said reflector metal layer, and said smoothing layer to form a reflector stack;
   forming a conformal passivation layer covering said reflector stack;
   forming an absorbing layer above said reflector stack and separated from said reflector stack.

14. The method of claim 13, further comprising forming a sacrificial layer over said conformal passivation layer.

15. The method of claim 14, further comprising forming vias over said substrate, said vias extending through said sacrificial layer and landing on respective via landing pads on said substrate.

16. The method of claim 14, further comprising forming at least one resistor connected to said absorbing layer over said sacrificial layer, wherein a resistance of said at least one resistor varies in response to light absorbed by said absorbing layer.

17. The method of claim 14, further comprising removing said sacrificial layer to form a void between said absorbing layer and said reflector stack.

18. The method of claim 13, wherein said conformal passivation layer covers sidewalls of said reflector stack.

19. The method of claim 13, wherein said patterning of said adhesion layer, said reflector metal layer, and said smoothing layer forms via landing pads on said substrate.

20. The method of claim 13, further comprising chemical mechanical polishing (CMP) said reflector metal layer to form a substantially flat top surface.

* * * * *